Nov. 24, 1925.  L. JAENICHEN  1,563,089
SCALE BEARING
Filed Aug. 15, 1923
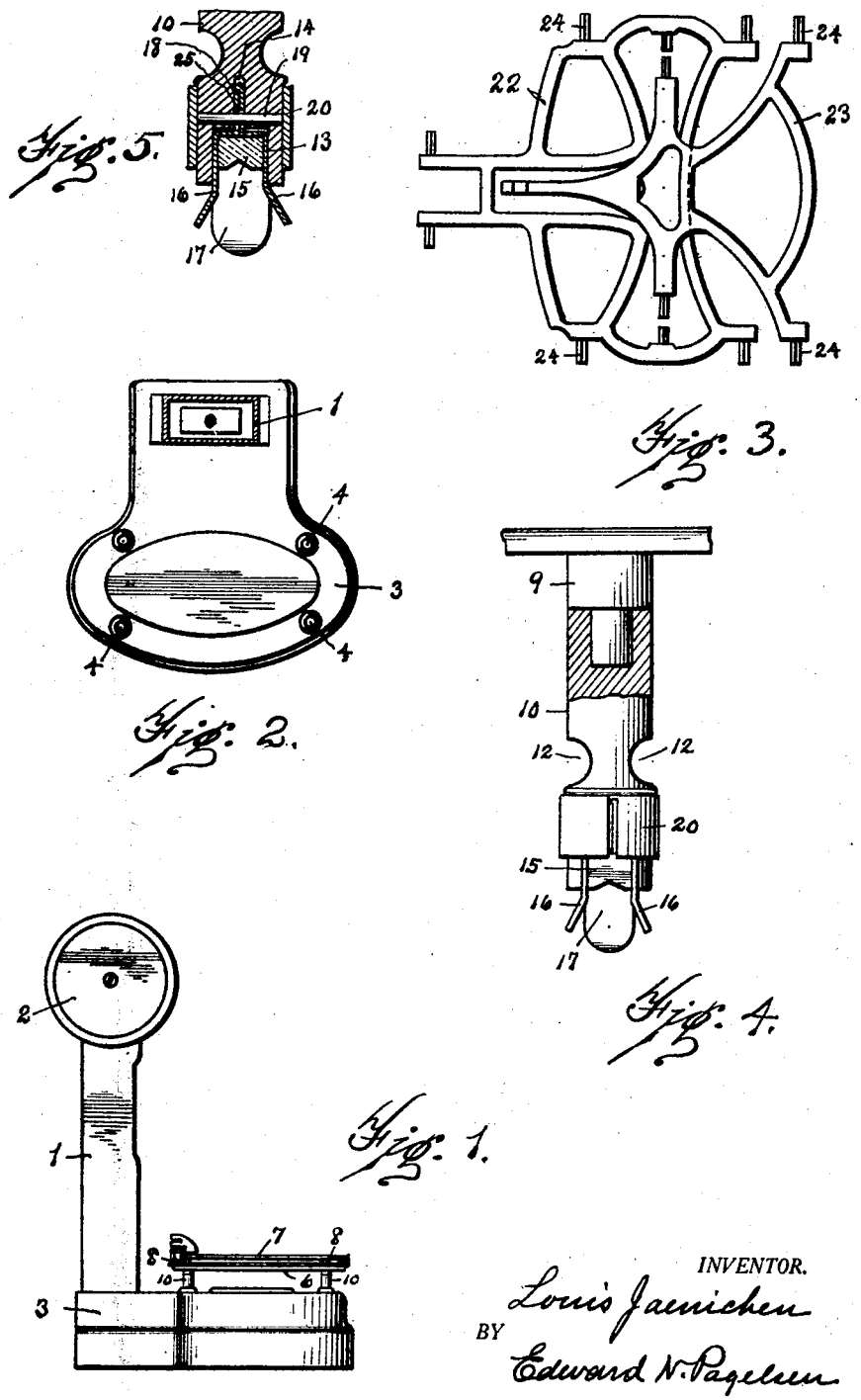
INVENTOR.
Louis Jaenichen
BY Edward N. Pagelsen
ATTORNEY.

Patented Nov. 24, 1925.

1,563,089

UNITED STATES PATENT OFFICE.

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

SCALE BEARING.

Application filed August 15, 1923. Serial No. 657,481.

*To all whom it may concern:*

Be it known that I, LOUIS JAENICHEN, a citizen of the United States, and residing at Detroit, in the county of Wayne and State of Michigan, have invented a new and Improved Scale Bearing, of which the following is a specification.

This invention relates to the construction of the bearings of the platforms of weighing scales which bearings rest upon knife-edge pivots attached to the lever mechanism to transmit the pressures of the loads thereto, and its object is to provide a bearing of this character which can be adjusted in every desirable manner. This invention consists in a set of legs extending down from the load receiver of the scale in alignment with the knife-edges of the levers, bearings at the bottoms of the legs adapted to rest on the knife edges, clips to receive the bearings, and transverse pivots mounted in said legs on which the clips are pivoted so as to permit the bearings to swing. The invention further consists in legs of the character described formed of two parts which are relatively rotatable, one of the parts being reduced in diameter so as to permit bending. It also consists of the details of construction, illustrated in the accompanying drawing and particularly pointed out in the claims.

In the accompanying drawing, Fig. 1 is a side elevation of a scale equipped with my improved bearings. Fig. 2 is a plan of the base. Fig. 3 is a plan of a standard pair of levers. Fig. 4 is an elevation of a leg. Fig. 5 is a vertical section of the lower end thereof.

Similar reference characters refer to like parts throughout the several views.

The construction of the indicating and lever mechanism of this scale forms no part of the present invention. The pedestal 1 supports the cylindrical case 2 and rests on a base 3 which differs from those now in use in having four holes 4 in its top 5 to permit the legs on the load receiver to pass down to the knife-edge pivots. The load receiver in the present case is in two parts, a frame 6 and a plate 7, the plate being preferably of glass and being supported by the knobs 8 of rubber on the frame.

Extending down from the frame 6 are four legs, each preferably of two parts 9 and 10 so that the parts 10 may be turned. The connections of these two parts should fit so tightly that rotation is difficult. The parts 10 are also preferably formed with grooves 12 to reduce their diameters so that they may be bent. The lower ends of the legs are formed with transverse notches having wider outer portions 13 and narrow inner portions 14.

The bearings 15 are preferably of agate or other very hard material and are held in resilient sheet metal clips each comprising the sides 16 which are brought together to constitute tongues 18 that extend into the inner portions 14 of the notches in the ends of the legs. When these clips are of resilient metal, the bearings 15 are retained in position but can be readily removed, ground to size and replaced for trial. This is important as it is often necessary to remove and grind these bearings several times before they are sufficiently accurate. Pins 19 extend through holes in the ends of the legs and in the tongues 18 and these pins may be held in position by the split spring-rings 20 which have the downwardly extending lips 17.

The levers 22 and 23 are provided with the usual knife-edge pivots 24 to receive the bearings 15. The ends of these knife-edges may be engaged by the lips 17 of the split rings 20 to prevent endwise movement of the bearing.

While these knife-edges may be out of alignment, the bearings 15 are more liable to be incorrectly made. I prefer therefore to form the holes 25 in the tongues 18 somewhat high so as to position the bearings below the final location. Thereafter the lower portions of these holes may be filed away to permit the bearings to be raised the correct distance. If the grooves in the bearings are at one side of the central plane of the notches in the legs, the lower portions of the legs may be bent at the grooves 12, and if these grooves are not parallel to the sides of the notches, the lower portions 10 of the legs may be turned to bring the grooves of opposed bearings into alignment. The bearings and their clips will swing on the pins 19 so that the bearings will engage the knife-edges throughout their lengths.

The load receiver and its legs may be lifted from the base to permit that to be cleaned and may then be replaced without changing any of the adjustments. All of the details however may be changed by those skilled in the art without departing from the spirit of my invention as set forth in the following claims.

I claim:

1. In a scale, a load receiver, legs extending downward therefrom and having notches in their lower ends, pins extending across said notches, clips pivotally mounted on said pins in the notches, and bearing blocks mounted in said clips, said legs being formed of two parts rotatable with respect to each other.

2. In a scale, a load receiver, legs extending downward therefrom and having notches in their lower ends, pins extending across said notches, clips pivotally mounted on said pins in the notches, and bearing blocks mounted in said clips, said legs being grooved transversely to permit bending.

3. In a scale, a load receiver, legs extending downward therefrom and having notches in their lower ends, pins extending across said notches, clips pivotally mounted on said pins in the notches, and bearing blocks freely removably mounted in said clips, said clips comprising resilient sides and ends to retain the bearings.

4. In a scale, a load receiver, legs extending downward therefrom and having notches in their lower ends, pins extending across said notches, clips pivotally mounted on said pins in the notches, and bearing blocks mounted in said clips, the inner portions of the notches in the legs being narrower than the lower outer portions, said pins extending across the reduced inner portions, said clips and bearings being mounted in the larger outer portions of the notches, said clips having tongues extending into the reduced inner ends of the notches and formed with holes to receive said pins.

LOUIS JAENICHEN.